US008223390B2

(12) United States Patent
Johnston

(10) Patent No.: US 8,223,390 B2
(45) Date of Patent: Jul. 17, 2012

(54) SYSTEMS AND METHODS FOR REDUCING COLOR REGISTRATION ERRORS IN TANDEM ENGINES

(75) Inventor: Peter Johnston, San Francisco, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 771 days.

(21) Appl. No.: 12/413,372

(22) Filed: Mar. 27, 2009

(65) Prior Publication Data

US 2010/0245519 A1 Sep. 30, 2010

(51) Int. Cl.
*G06K 15/02* (2006.01)

(52) U.S. Cl. ......... 358/1.2; 358/3.26; 358/1.9; 347/116; 347/115; 347/234; 347/233; 347/225; 347/224; 347/235; 347/250; 347/248; 347/249; 399/301; 399/298; 399/297; 399/179

(58) Field of Classification Search ........................ None
See application file for complete search history.

(56) References Cited

U.S. PATENT DOCUMENTS 4,782,398 A 11/1988 Mita
5,041,920 A 8/1991 Hayes et al.
5,477,257 A 12/1995 Murata
5,646,670 A 7/1997 Seto et al.
5,739,842 A 4/1998 Murata
5,760,811 A 6/1998 Seto et al.
5,946,334 A 8/1999 Ema et al.
6,092,171 A 7/2000 Relph
6,133,932 A * 10/2000 Webb et al. .................. 347/232
6,215,513 B1 4/2001 Ashikaga
6,252,675 B1 6/2001 Jacobs
6,369,911 B1 4/2002 Hattori
6,472,946 B2 10/2002 Takagi
6,476,847 B2 11/2002 Satoh et al.
6,498,617 B1 12/2002 Ishida et al.
6,603,116 B2 8/2003 Niito
6,707,563 B1 3/2004 Barry et al.
6,731,317 B2 5/2004 Ema et al.
6,775,032 B2 8/2004 Jacobs
7,009,729 B2 3/2006 Fujita
7,031,025 B1 4/2006 He et al.
7,038,671 B2 5/2006 Willis et al.
7,064,859 B1 6/2006 Dittrich et al.

(Continued)

OTHER PUBLICATIONS

U.S. Appl. No. 11/479,294, filed Jun. 30, 2006.

(Continued)

*Primary Examiner* — Benny Q Tieu
*Assistant Examiner* — Paul F Payer
(74) *Attorney, Agent, or Firm* — Finnegan, Henderson, Farabow, Garrett & Dunner, L.L.P.

(57) ABSTRACT

Systems and methods are provided for correcting color registration errors in a printing device comprising a plurality of print engines driven by a single pixel frequency clock. In some embodiments, the print engines can include a reference print engine and one or more non-reference print engines. An adjusted resolution may be computed for color data sent to each non-reference engine to offset color registration errors attributable to the non-reference engine. The adjusted resolution is computed using calibration information for the non-reference print engines relative to the reference engine, and resolution information for color data processed by the first reference engine. The resolution of color data processed by each non-reference print engine is adjusted according to the computed adjusted resolution for the non-reference engine and sent to the print engines for printing.

20 Claims, 3 Drawing Sheets

U.S. PATENT DOCUMENTS

| | | | | |
|---|---|---|---|---|
| 7,428,075 | B2 | 9/2008 | Johnston | |
| 7,453,608 | B2 * | 11/2008 | Kambegawa et al. | 358/500 |
| 7,679,630 | B2 * | 3/2010 | Sagi et al. | 347/116 |
| 2001/0030769 | A1 | 10/2001 | Jacobs | |
| 2001/0030796 | A1 | 10/2001 | Yao | |
| 2004/0156079 | A1 | 8/2004 | Marshall et al. | |
| 2006/0001467 | A1 | 1/2006 | Fujino et al. | |
| 2007/0153247 | A1 | 7/2007 | Nagasaka | |
| 2007/0172270 | A1 * | 7/2007 | Jorgens et al. | 399/320 |
| 2008/0002018 | A1 | 1/2008 | Johnston | |
| 2008/0002228 | A1 | 1/2008 | Johnston | |
| 2008/0002229 | A1 | 1/2008 | Johnston | |
| 2008/0007744 | A1 | 1/2008 | Johnston | |
| 2008/0007745 | A1 | 1/2008 | Johnston | |

OTHER PUBLICATIONS

U.S. Appl. No. 11/479,562, filed Jun. 30, 2006.
U.S. Appl. No. 11/480,221, filed Jun. 30, 2006.
U.S. Appl. No. 11/479,596, filed Jun. 30, 2006.
U.S. Appl. No. 11/479,896, filed Jun. 30, 2006.
U.S. Appl. No. 11/728,241, filed Jun. 30, 2006.
U.S. Appl. No. 12/413,410, filed Mar. 27, 2009.
Notice of Allowance dated Jun. 18, 2010, in related application U.S. Appl. No. 11/479,294, filed Jun. 30, 2006, Peter Johnston.
Notice of Allowance dated Mar. 5, 2010, in related application U.S. Appl. No. 11/479,294, filed Jun. 30, 2006, Peter Johnston.
Office Action dated Nov. 23, 2009, in related application U.S. Appl. No. 11/479,294, filed Jun. 30, 2006, Peter Johnston.
Office Action dated Apr. 17, 2009, in related application U.S. Appl. No. 11/479,294, filed Jun. 30, 2006, Peter Johnston.
Notice of Allowance dated Jul. 13, 2009, in related application U.S. Appl. No. 11/479,562, filed Jun. 30, 2006, Peter Johnston.
Office Action dated Feb. 20, 2009, in related application U.S. Appl. No. 11/479,562 filed Jun. 30, 2006, Peter Johnston.
Office Action dated Jun. 18, 2008, in related application U.S. Appl. No. 11/479,562, filed Jun. 30, 2006, Peter Johnston.
Office Action dated Dec. 12, 2007, in related application U.S. Appl. No. 11/479,562, filed Jun. 30, 2006, Peter Johnston.
Notice of Allowance dated May 20, 2008, in related application U.S. Appl. No. 11/480,221, filed Jun. 30, 2006, Peter Johnston.
Office Action dated Jan. 18, 2008, in related application U.S. Appl. No. 11/480,221, filed Jun. 30, 2006, Peter Johnston.
Office Action dated Mar. 26, 2010, in related application U.S. Appl. No. 11/479,596, filed Jun. 30, 2006, Peter Johnston.
Office Action dated May 6, 2010, in related application U.S. Appl. No. 11/479,896, filed Jun. 30, 2006, Peter Johnston.
Office Action dated Sep. 23, 2010, in related application U.S. Appl. No. 11/479,896, filed Jun. 30, 2006, Peter Johnston.
Office Action dated Apr. 30, 2010, in related application U.S. Appl. No. 11/728,241, filed Mar. 23, 2007, Peter Johnston.
Office Action dated Nov. 5, 2009, in related application U.S. Appl. No. 11/728,241, filed Mar. 23, 2007, Peter Johnston.

* cited by examiner

SYSTEMS AND METHODS FOR REDUCING COLOR REGISTRATION ERRORS IN TANDEM ENGINES

TECHNICAL FIELD

This disclosure relates to the correction of color registration errors in tandem print engines in printing systems and in particular, to systems and methods for correcting color registration errors in tandem print engines locked to a single video frequency.

DESCRIPTION OF RELATED ART

A typical printing system, such as a Cyan, Magenta, Yellow, and Black ("CMYK") color space based printer, may include multiple print engines that operate in tandem to control various mechanical and electrical parts configured to print data on a page at a predetermined print speed. Each print engine may process data for a single color plane and deal with the control and configuration of printer parts to print data for that color plane. For example, in a CMYK printer, four print engines—one for each of the C, M, Y, and K planes may be used. The print engines are usually controlled by a print controller, which communicates with a print data input device (e.g., a personal computer) and the print engine, to coordinate timing and other parameters related to the printing process. The print controller may receive image data for printing from the input device at some resolution via a data transferring interface, can generate rasterized images, and send them to the print engines for printing.

In tandem engines, each engine is typically driven by a separate pixel clock. However, printers with tandem engines are susceptible to color registration errors because of mechanical and other variations. Color registration errors occur when the image corresponding to one color plane is not registered at the correct pixel writing position in relation to the image corresponding to another color plane. For example, as a consequence of the misregistration, the image corresponding to the black color plane may be 8.5 inches wide but the image corresponding to the yellow color plane may be 8.3 inches wide.

To correct color registration errors, pixel clocks for the individual color planes are typically adjusted so that they operate at slightly different frequencies. The frequency of the pixel clock governs the width of individual pixels. As a consequence of pixel frequency adjustments, pixel widths are adjusted for one or more of the tandem engines ensuring that pixel writing positions of the resulting images from the various color planes match. For example, the pixel frequency of the K-plane may be fixed and pixel frequencies for the other planes may be adjusted during calibration so that pixel sizes for all four color planes are identical when printing. Typically, frequency adjustments may cause pixel frequency variations of about ±1% in steps of one-thousandth of one percent of the base (K) frequency.

To lock pixel clocks to their respective frequencies, CMYK printers typically use four different PLL circuits. The use of four PLL circuits contributes to the increased complexity and cost of printing systems and may also occupy valuable area on a chip that could potentially provide other functionality. Therefore, there is a need for systems and methods that provide a mechanism to correct registration errors for tandem engines that permit the engines to operate using a single frequency.

SUMMARY

In accordance with disclosed embodiments, systems and methods are provided for correcting color registration errors in a printing device comprising a plurality of print engines, wherein the plurality of print engines are driven by a single pixel frequency and include at least one first reference engine, the method comprises the steps of: computing an adjusted resolution for color data to offset color registration errors attributable to at least one second print engine, wherein the adjusted resolution is computed based on calibration information for the at least one second print engine relative to the first reference engine and resolution information for color data for the first reference engine; adjusting the resolution of the color data for the at least one second print engine to the computed adjusted resolution; and printing the resolution adjusted color data using the at least one second print engine.

Embodiments of the present invention also relate to software, firmware, and program instructions created, stored, accessed, or modified by processors using computer-readable media or computer-readable memory. The methods described may be performed on a computer and/or a printing device.

Additional objects and advantages will be set forth in part in the description, which follows, and in part will be obvious from the description, or may be learned by practice. The objects and advantages will be realized and attained by means of the elements and combinations particularly pointed out in the appended claims. It is to be understood that both the foregoing general description and the following detailed description are exemplary and explanatory only and are not restrictive of the invention, as claimed. These and other embodiments are further explained below with respect to the following figures.

DETAILED DESCRIPTION

Reference will now be made in detail to various embodiments, which are illustrated in the accompanying drawings. Wherever possible, the same reference numbers will be used throughout the drawings to refer to the same or like parts.

Figure 1:
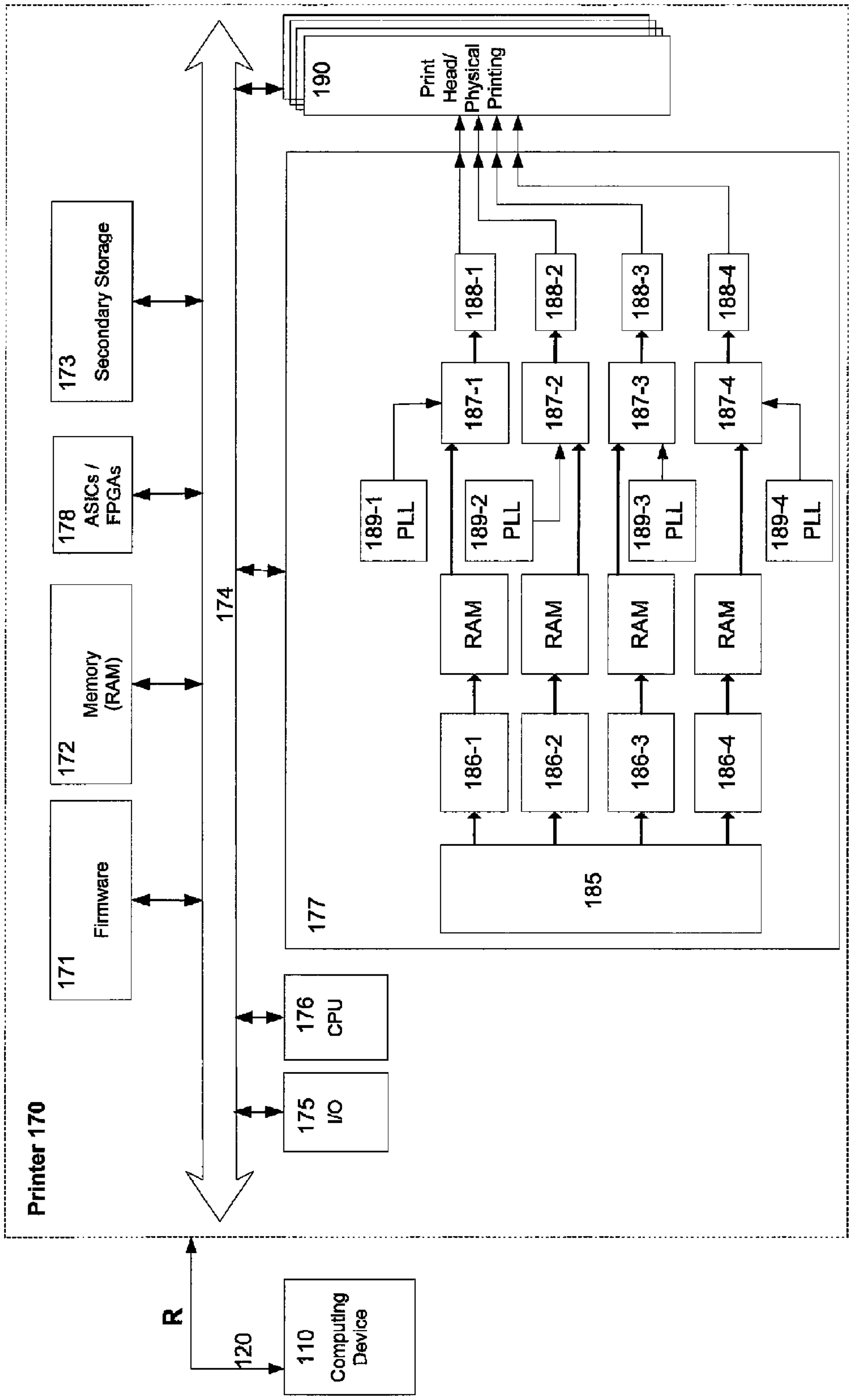
FIG. 1 shows a block diagram of a typical exemplary printer.

FIG. 1 is a block diagram of a typical printer 170 coupled to exemplary computer 110. Printer 170 may be able to communicate with and access resources on computing device 110 using I/O ports 175 and connection 120. Printer 170 may receive input print data, including color and other print data, from computing device 110. For example, computing device 110 may be a general purpose computer that can include a monitor to display data, which in some cases may be sent to printer 170 for printing. Printer 170 may use a color space native to printer 170 such as a CMY color space, a CMYK color space, or some other type of color space to represent color data prior to printing. In some implementations, printer 170 may be a raster printer. In some implementations, printer 170 may be capable of accepting data in the form of a page description language, such as Adobe PostScript™, or PDF™.

Printer 170 may further include bus 174 that couples CPU 176, firmware 171, memory 172, print engines 177, and secondary storage device 173. Printer 170 may also include other Application Specific Integrated Circuits (ASICs), and/or Field Programmable Gate Arrays (FPGAs) 178 that are capable of executing various applications. Printer 170 may also be capable of executing software including a printer operating system and other appropriate application software.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including, but not limited to, a boot-up sequence, pre-defined routines, routines to perform color management, color data resolution adjustments, and other code. Code and data in firmware 171 may be copied to memory 172 prior to being acted upon by CPU 176. Data and instructions in firmware 171 may be upgradeable. Exemplary CPU 176 may also act upon instructions and data and provide control and data to ASICs/FPGAs 178 and print engines 177 to generate printed documents. Exemplary ASICs/FPGAs 178 may also provide control and data to print engine 177. Data and control bus 174 may also couple I/O module 175, control block 185, de-compressor modules 186 with attached RAM, PWM logic modules 187, driver circuits 188, and print heads/physical printing electronics 190.

In conventional systems, computer 110 may send image data at a resolution R to I/O module 175 over connection 120. The bandwidth of connection 120 may be divided into a plurality of sub-channels and print data may be transferred via the plurality of sub-channels in a parallel manner. For example, for CMYK color printers, the print color data may have four planes (one for each of the C.M, Y, and K color planes), and data for each color plane may be transferred at resolution R via a separate sub-channel of connection 120. The image data sent from the computer 110 may be compressed. In some embodiments, the compressed image data may be in a line-sequential compressed format. For example, data received by I/O module 175 may be placed in memory 172 under the control of the CPU 176. In some implementations, when image data for a complete page has been stored in memory 172, a print sequence may be initiated.

A signal typically referred to as top of data (TOD) or "vsync" may be generated and routed to PWM logic modules 187 to indicate when the process of transferring image data transfer to the print medium can begin. Once the TOD signal is received, CPU 176 may initiate a transfer from memory 172 to de-compressor modules 186. In some embodiments, each of the de-compressor modules 186-1, 186-2, 186-3, and 186-4 may process data for distinct color planes. De-compressor modules 186-1, 186-2, 186-3, and 186-4 may receive compressed image data for their respective color planes, which they may then decompress and store in their respective RAM modules. Each de-compressor module 186-*i* may then send the data to its corresponding PWM logic module 187-*i*, where $1 \leqq i \leqq 4$.

A beam detect sensor (not shown) can detect a laser beam's position and cause the generation of pulses so that image data can be properly aligned from line to line in a printed image. In some embodiments, the beam detect sensor may generate a start of scan (SOS) or "hsync" signal for each scan line in an image, or for a set of scan lines in an image. The SOS or hsync signal may also be routed to PWM logic modules 187.

A PWM logic module 187-*i* may receive hsync and vsync pulses, raw image data from corresponding de-compressor module 186-*i*, where $1 \leqq i \leqq 4$, as well as clock input from a pixel clock generation module. The pixel clock generation module (not shown) may be a crystal oscillator or a programmable clock oscillator, or any other appropriate clock generating device. In some printers, such as for exemplary "tandem engine" printer 170, video data for each color is processed by a distinct print engine. Each print engine may be driven by a separate pixel clock. In conventional printers, pixel clock frequency may be adjusted to correct any color registration errors that occur because of mechanical and other imperfections. Calibration may be used determine the adjusted frequency of each engine. For example, in a CMYK printer, the pixel clock frequency of each of the C, M, and Y engines may be adjusted to correct registration errors during calibration by using the pixel clock frequency of the K-engine as a reference. One or more programmable clock oscillators may be used to facilitate calibration.

In conventional printers 170, each PWM module may be coupled to a distinct phase locked loop ("PLL") module 189. PLL modules 189 may ensure that the pixel clocks driving the print engines bear a fixed relationship relative to the reference pixel clock signal, which may be the pixel clock for the K-engine in the case of a CMYK printer. PWM logic module 187 may also be coupled to driver circuit 188 and printhead 190 by various data and control signal paths. The PWM pulses generated by PWM logic modules 187-*i* may be streamed to corresponding driver circuits 188-*i* for onward transmission to printheads 190-*i*, where $1 \leqq i \leqq 4$. Exemplary printheads 190-1, 190-2, 190-3, and 190-4 may be a laser printheads.

Printheads 190 may generate laser beams that cause a latent image of charged and discharged areas to be built up on a photosensitive drum, which is developed by a toner at a developing station before being transferred to a transfer belt. For a multi-component image, such as a color image, the latent image building process may repeat for each of the components. For example, for CMYK color printers, the latent image building process on the photosensitive drum may be repeated for each of the colors C, M, Y, and K. Toner images for all four colors may be accumulated on the transfer belt before a complete toner image is transferred to the page.

Each of the logical or functional modules described above for printer 170 may comprise multiple modules. The modules may be implemented individually or their functions may be combined with the functions of other modules. Further, each of the modules may be implemented on individual components, or the modules may be implemented as a combination of components. The various modules and subsystems described above may be implemented by hardware, software, or firmware or by various combinations thereof.

Exemplary computer 110 may be a computer workstation, desktop computer, laptop computer, or any other computing device capable of being used with printer 100. In some embodiments, exemplary computer 110 may include, among other things, a processor, a memory, an I/O interface, secondary memory such as a hard disk, and other computer readable media including floppy disks, CD±RW, DVD±RW and/or Blu-ray™ RW drives, flash memory drives, Memory Sticks™, Secure Digital High Capacity ("SDHC") cards and various other fixed and removable media. The processor may be a central processing unit ("CPU"). Depending on the type of computer being used, processor may include one or more printed circuit boards, and/or a microprocessor chip. The processor may execute sequences of computer program instructions to perform various processes. The computer program instructions may be accessed and read from memory, or any other suitable memory location, and/or secondary storage or computer readable media, and may be executed by the processor. The memory may be any type of Dynamic Random Access Memory ("DRAM") such as, but not limited to, SDRAM, or RDRAM.

Figure 2:
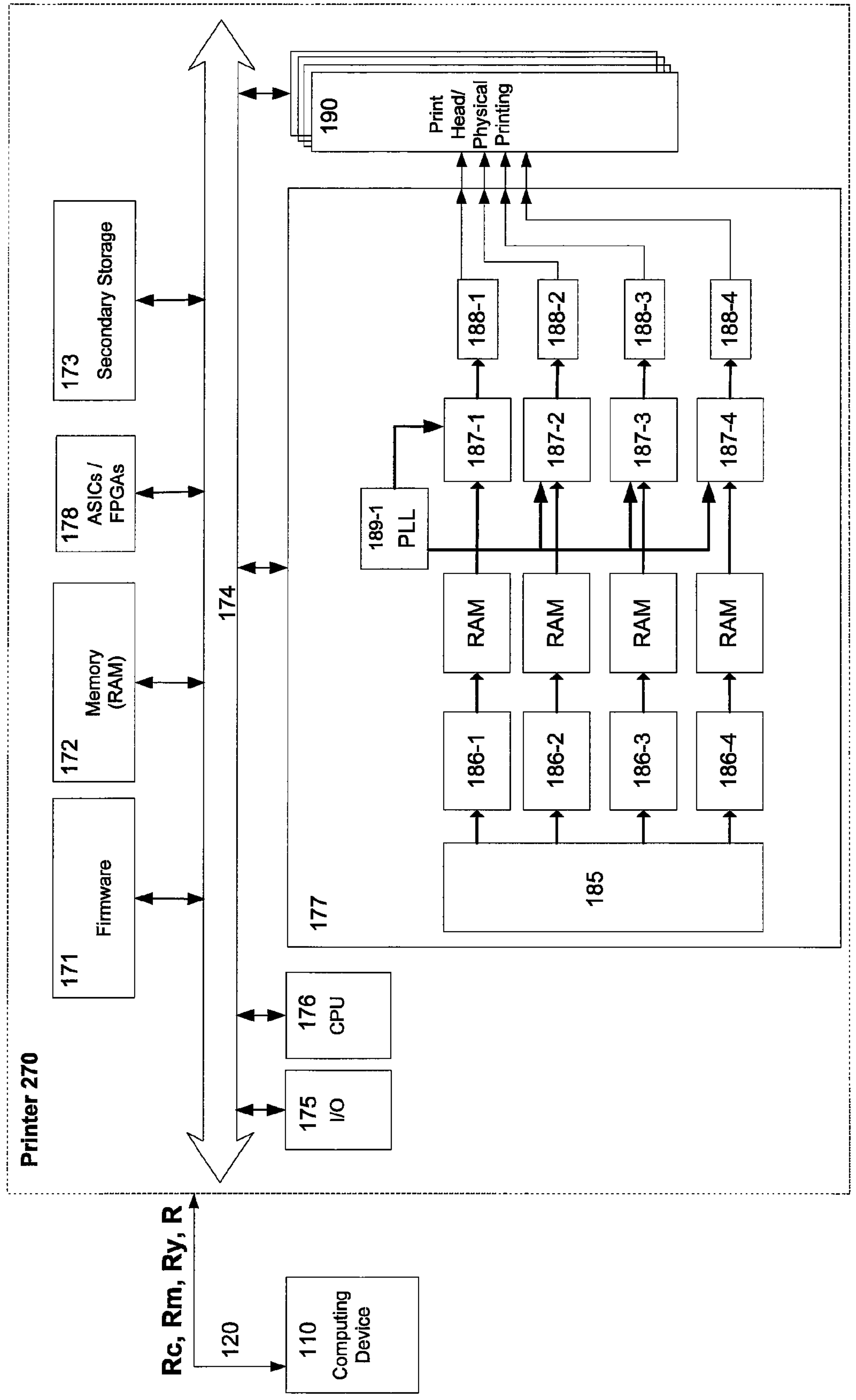
FIG. 2 shows a block diagram of an exemplary printer consistent with disclosed embodiments.

FIG. 2 shows a block diagram of an exemplary printer consistent with disclosed embodiments. As shown in FIG. 2, exemplary printer 270 may receive data for the four exemplary CMYK color planes over connection 120 at resolutions Rc, Rm, Ry, and R, respectively, from computer 110. Note that the depiction of color data sent over connection 120 as comprising color data in four different resolutions is exemplary only. In general, data for all four color planes may also be sent using the same resolution and the resolution of the data may be modified in a manner consistent with disclosed embodiments to offset color registration errors. For example, in some embodiments, the data sent to printer 270 from computer 110 over connection 120 may be at resolution R for all four color planes (i.e. Rc=Rm=Ry=R), and printer 170 may include a pre-processing module (not shown) to convert the data for the exemplary CMYK color planes to data at adjusted resolutions, Rc, Rm, and Ry, respectively. The adjusted resolutions Rc, Rm, and Ry may be computed to offset registration errors for the C, M, and Y print engines, respectively. In some embodiments, the pre-processing module may be implemented on a print controller coupled to printer 270. In general, the print controller may be internal or external to printer 270. In some embodiments, pre-processing module may be a routine in firmware 171, or secondary storage 173, which may be copied to memory 172 prior to being acted upon by processor 176. In some embodiments, such as when printer 270 is a raster printer, color data at different resolutions for the various color planes may be generated by a rasterizer running on computer 110, which may be controlled by a device driver for printer 270.

In some embodiments, during calibration, color registration correction information for the C, M, and Y color print engines may be determined and specified. For example, this information may take the form of "Main Scan Scale Factor Correction Information" ("MSSFCI"), "Main Scan Position Registration Error Information" (MSPREI") and/or other error correction information relative to the black or K-engine. The MSSFCI may be specified as a correction amount of the main scale factor for each color in one-thousandth of one percent units using black as the base. The MSPREI may be specified as the registration error amount of the main scan position of each color in fractional dot units for some specified dots per inch ("dpi") resolution. Various other ways of specifying registration error are also available and the methods disclosed may also be used when other forms of error specification are utilized as would be apparent to one of ordinary skill in the art.

For the purposes of this discussion, it is assumed that the error is specified using MSSFCI. For example, for printing at a resolution of 600 dpi, if the reference pixel clock frequency (for K here), given by $f_R$ is 35 MHz, and the MSSFCI correction factors are specified as $C_Y$=+0.001%, $C_M$=−0.015%, and $C_C$=+0.459%, then the frequency of the pixel clock $f_Y$ for the Y-plane in the conventional printer in FIG. 1 is given by: $f_Y=f_R+[f_R*(C_Y/100)]=35+[(35*0.00001)]=35.00035$ MHz. Similarly, the frequencies of the pixel clock for the M and C planes may be calculated using $C_M$ and $C_C$ as $f_M$=34.99475 MHz, and $f_C$=35.16065 MHz, respectively.

A positive MSSFCI indicates that the clock frequency for the corresponding pixel clock may be increased to correct the registration error. Conversely, a negative MSSFCI indicates that the clock frequency for the corresponding pixel clock may be lowered correct the registration error. In the conventional printer 170 of FIG. 1, the relationships of the three pixel clocks for the C, M, and Y, planes relative to the pixel clock for the K-plane are maintained by the PLL modules 189-1, 189-2, and 189-3, respectively, thereby reducing or eliminating the registration errors.

Correction of registration errors may also be accomplished by changing the resolution (dpi) of a color plane relative to the reference plane. In some embodiments, such as exemplary printer 270 shown in FIG. 2, the reliance on multiple corrected video frequencies and multiple PLL modules 189 may be eliminated by the use of resolution modification techniques disclosed herein. In some embodiments, instead of varying the frequency of the pixel clock corresponding to a color plane, the resolution of print data for that color plane may be altered. Thus, a single pixel clock and PLL-module 189-1 may be used to drive all the print engines in printer 270 in a manner consistent with disclosed embodiments.

To illustrate the technique, in the example above, if the width of the printed page including the left margin is 10 inches, then at the given reference resolution R=600 dpi, the width would correspond to $N_R$=6000, where $N_R$ is the number of dot clock cycles, or the distance in dots, to the rightmost dot in a single line for the reference K-plane. To avoid misregistration, the distance to the rightmost dot for Y-plane data using the notional calibration-adjusted clock (with frequency $f_Y$) for the Y-plane is also 6000 dots. Therefore, $N_Y$—representing the distance to rightmost dot for Y-plane data (in dots)—using the reference K-clock may be calculated using the equation, $N_Y$=6000*35 MHz/35.00035 MHz=5999.4 dots, which corresponds to a resolution of 599.994 dpi over the 10-inch page width. Similarly, for the example above, resolutions for the M and C-planes may be calculated as $R_M$=600.09 dpi and $R_C$=597.246 dpi, respectively. When $f_Y$ is greater than the reference frequency $f_R$, Y-plane image data may be wider than the reference K-plane image data, if the Y-plane data is printed using the frequency $f_R$ of the reference K-clock. Accordingly, some number of pixels may be removed from Y-plane data (as specified by the equation above) thereby reducing the resolution of the Y-plane data.

In general, resolution (dpi) is increased when the MSSFCI is negative, and resolution is decreased when the MSSFCI is positive to correct any registration errors that would have resulted without the resolution adjustment. In general the dpi for a color plane may be calculated as $R_P=[(f_R*N_R)/f_P]$, where $R_P$ is the resolution of color plane P in dpi; $f_P$ is the calculated frequency adjustment for plane P using provided MSSFCI data; $f_R$ is the pixel clock frequency of the reference plane; and $N_R$ is the number of dot clocks to the rightmost dot for the reference plane.

As shown in FIG. 2, data for each of C, M, and Y color planes may be adjusted to resolutions $R_C$, $R_M$, and $R_Y$, respectively, before being sent to printer 270 over connection 120. In some embodiments, the resolution adjustments may be made by a pre-processing module running on printer 170, or a printer controller coupled to printer 270 prior to sending the resolution adjusted color data to the print engines. Further, as shown in FIG. 2, printer 170 may use a single PLL and a single video frequency to drive PWM modules 187-1, 187-2, 187-3, and 187-4 for the C, M, Y, and K color planes, respectively.

Figure 3:
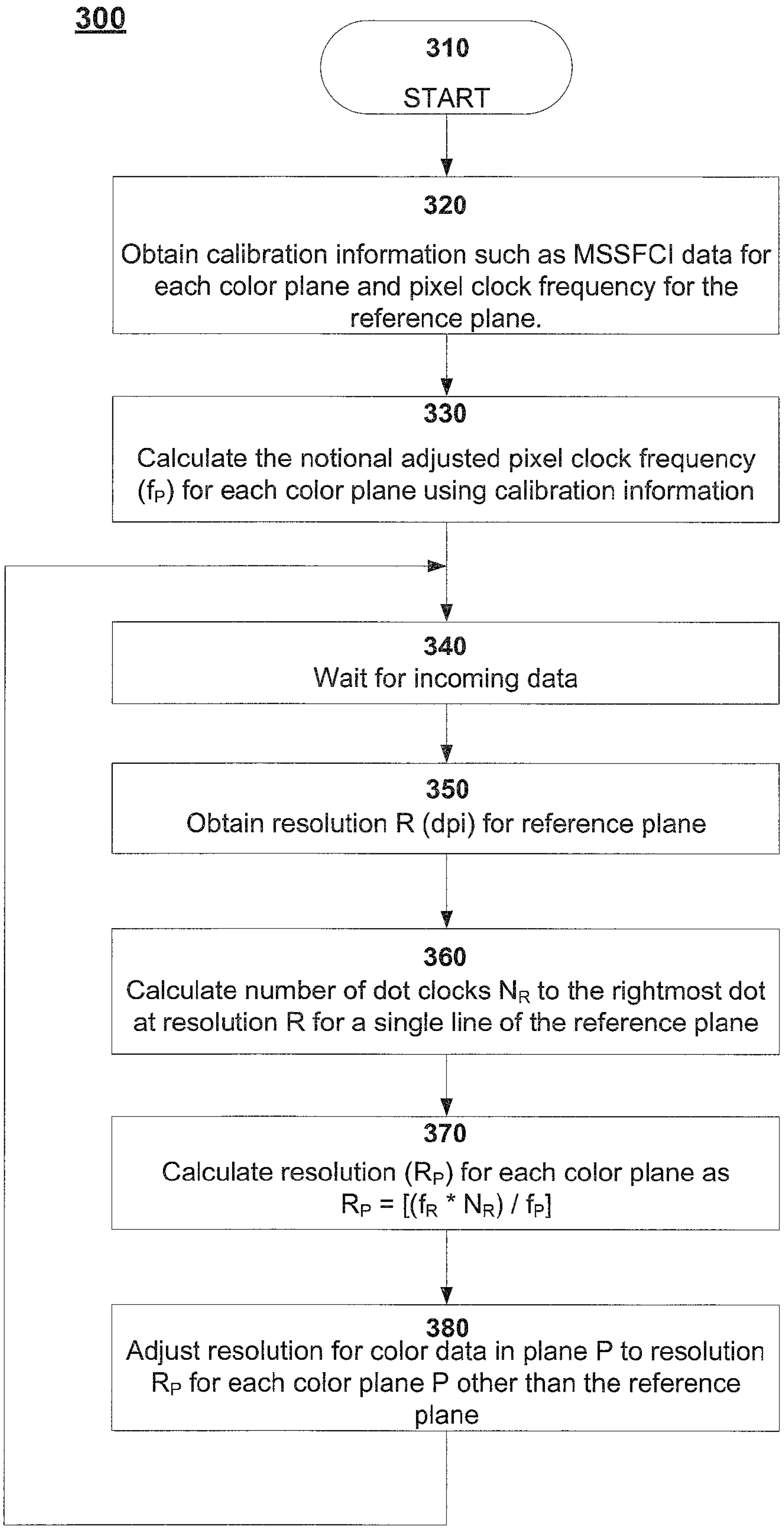
FIG. 3 shows a flowchart illustrating an exemplary method 300 for resolution modification to support a single video frequency for tandem print engines consistent with disclosed embodiments.

FIG. 3 shows a flowchart illustrating an exemplary method 300 for resolution modification to support a single video frequency for tandem print engines consistent with disclosed embodiments. In some embodiments, method 300 or a portion of method 300 may be implemented on computer 110, printer 270, a print controller coupled to printer 270, or some combination thereof. For example, CPU 176 may copy a routine implementing method 300 from firmware 171 to memory 172 and execute the routine on printer 270. In some embodiments, method 300 may be implemented by a driver for printer 270 running on computer 110.

The algorithm commences in step 310. In step 320, calibration information, such as MSSFCI data, for each color plane and pixel clock frequency for the reference plane $f_R$ may be obtained. Next, in step 330, the notional adjusted pixel clock frequency ($f_P$) for each color plane is calculated using the calibration information. Note that $f_P$ is the calculated notional adjusted pixel clock frequency ($f_P$) for a color plane P, i.e. the actual pixel clock frequency used to drive the print engines for the individual color planes is not adjusted or changed.

In step 340, the algorithm can wait for incoming data. In step 350, the resolution R (dpi) for reference plane may be obtained. Next, in step 360, the number of dot clocks $N_R$ to the rightmost dot at resolution R for a single line of the reference plane may be calculated. In step 370, the resolution ($R_P$) for each color plane may be calculated as $R_P=[(f_R*N_R)/f_P]$. In step 380, the resolution for color data in plane P may be changed to adjusted resolution $R_P$—for each color plane P other than the reference plane. The algorithm then returns to step 340, where it awaits new incoming data.

Further, methods consistent with disclosed embodiments may conveniently be implemented using program modules, hardware modules, or a combination of program and hardware modules. Such modules, when executed, may perform the steps and features disclosed herein, including those disclosed with reference to the exemplary flow chart shown in the figures. The operations, stages, and procedures described above and illustrated in the accompanying drawings are sufficiently disclosed to permit one of ordinary skill in the art to practice the invention. Moreover, there are many computers and operating systems that may be used in practicing embodiments of the instant invention and, therefore, no detailed computer program could be provided that would be applicable to these many different systems. Each user of a particular computer will be aware of the language, hardware, and tools that are most useful for that user's needs and purposes.

The above-noted features and aspects may be implemented in various environments. Such environments and related applications may be specially constructed for performing the various processes and operations of the invention, or they may include a general-purpose computer or computing platform selectively activated or reconfigured by program code to provide the functionality. The processes disclosed herein are not inherently related to any particular computer or other apparatus, and aspects of these processes may be implemented by any suitable combination of hardware, software, and/or firmware.

Embodiments disclosed also relate to compute-readable media and/or memory that include program instructions or program code for performing various computer-implemented operations based on the methods and processes of embodiments of the invention. The program instructions may be those specially designed and constructed, or they may be of the kind well known and available to those having skill in the computer arts. Examples of program instructions include, for example, machine code, such as produced by a compiler, and files containing a high-level code that can be executed by the computer using an interpreter.

It is intended that the specification and examples be considered as exemplary only, with a true scope and spirit of the invention being indicated by the following claims.

What is claimed is:

1. A processor-implemented method of correcting color registration errors in a printing device comprising a plurality of print engines, wherein the plurality of print engines are driven by a single pixel frequency and include at least one first reference engine, the method comprising the processor implemented steps of:

computing an adjusted resolution for color data to offset color registration errors attributable to at least one second print engine, wherein the adjusted resolution is computed based on calibration information for the at least one second print engine relative to the first reference engine and resolution information for color data for the first reference engine;

adjusting the resolution of the color data for the at least one second print engine to the computed adjusted resolution; and printing the resolution adjusted color data using the at least one second print engine.

2. The processor-implemented method of claim 1, wherein each print engine processes color data for a distinct color plane.

3. The processor-implemented method of claim 1, wherein the calibration information for the at least one second engine comprises at least one of:

Main Scan Scale Factor Correction Information; or

Main Scan Position Registration Error Information.

4. The processor-implemented method of claim 1, wherein computing the adjusted resolution for color data to offset color registration errors attributable to the at least one second print engine further comprises:

calculating a notional adjusted pixel clock frequency $f_P$ for the at least one second print engine using the calibration information and a pixel clock frequency for the first reference engine $f_R$;

calculating a number dot clocks to the rightmost dot in a single line for the first reference engine $N_R$ using resolution information for color data processed by the first reference engine; and computing the adjusted resolution for the color data processed by at least one second print engine $R_P$, as $R_P=[(f_R*N_R)/f_P]$.

5. The processor-implemented method of claim 1, wherein the method is performed on a computer coupled to a printer.

6. The processor-implemented method of claim 5, wherein the method is performed by a device driver for the printing device.

7. The processor-implemented method of claim 1, wherein the method is performed on one of:

a printer; or a print controller coupled to a printer.

8. The processor-implemented method of claim 1, wherein the color data is specified using a page description language.

9. The processor-implemented method of claim 8, wherein the page description language is one of:

PostScript; or

PDF.

10. The processor-implemented method of claim 1, wherein the printing device is a CMYK printer.

11. The processor-implemented method of claim 10, wherein the first reference engine corresponds to the print engine for the K-plane, and the at least one second plane corresponds to at least one of the M, Y, and K planes.

12. A printing device comprising:

a plurality of print engines including at least one first reference engine, the plurality of print engines being driven by a single pixel frequency and capable of printing color data;

a memory coupled to the printer, wherein the memory holds calibration information for at least one second print engine relative to the first reference engine; and a processor coupled to the memory and the print engines, wherein the processor sends resolution adjusted color data to the at least one second print engine, the resolution adjusted color data being computed to offset color registration errors attributable to the at least one second print engine based on resolution information for color data processed by the first reference engine and the calibration information retrieved from the memory.

13. The printing device of claim 12, further comprising a phase-locked loop module coupled to the print engines, wherein the phase-locked loop module drives the plurality of print engines at the single pixel clock frequency.

14. The printing device of claim 12, wherein the printing device is a CMYK printer.

15. The printing device of claim 12, wherein the first reference engine corresponds to the print engine for the K-plane, and the at least one second plane corresponds to at least one of the M, Y, and K planes.

16. A non-transitory computer-readable medium that contains instructions which, when executed by a processor, performs steps in a method of correcting color registration errors in a printing device comprising a plurality of print engines, wherein the plurality of print engines are driven by a single pixel frequency and include at least one first reference engine, the method comprising the processor implemented steps of:

computing an adjusted resolution for color data to offset color registration errors attributable to at least one second print engine, wherein the adjusted resolution is computed based on calibration information for the at least one second print engine relative to the first reference engine and resolution information for color data for the first reference engine;

adjusting the resolution of the color data for the at least one second print engine to the computed adjusted resolution; and printing the resolution adjusted color data using the at least one second print engine.

17. The computer-readable medium of claim 16, wherein each print engine processes color data for a distinct color plane.

18. The computer-readable medium of claim 16, wherein the calibration information for the at least one second engine comprises at least one of:

Main Scan Scale Factor Correction Information; or

Main Scan Position Registration Error Information.

19. The computer-readable medium of claim 16, wherein computing the adjusted resolution for color data to offset color registration errors attributable to the at least one second print engine further comprises:

calculating a notional adjusted pixel clock frequency $f_P$ for the at least one second print engine using the calibration information and a pixel clock frequency for the first reference engine $f_R$;

calculating a number dot clocks to the rightmost dot in a single line for the first reference engine $N_R$ using resolution information for color data processed by the first reference engine; and computing the adjusted resolution for the color data processed by at least one second print engine $R_P$, as $R_P=[(f_R*N_R)/f_P]$.

20. The computer-readable medium of claim 16, wherein the method is performed on a computer coupled to a printer.

* * * * *